Oct. 9, 1934.  A. E. BACKLUND ET AL  1,976,429
AUTOMOTIVE THROTTLE AND CHOKE CONTROL
Filed March 27, 1933
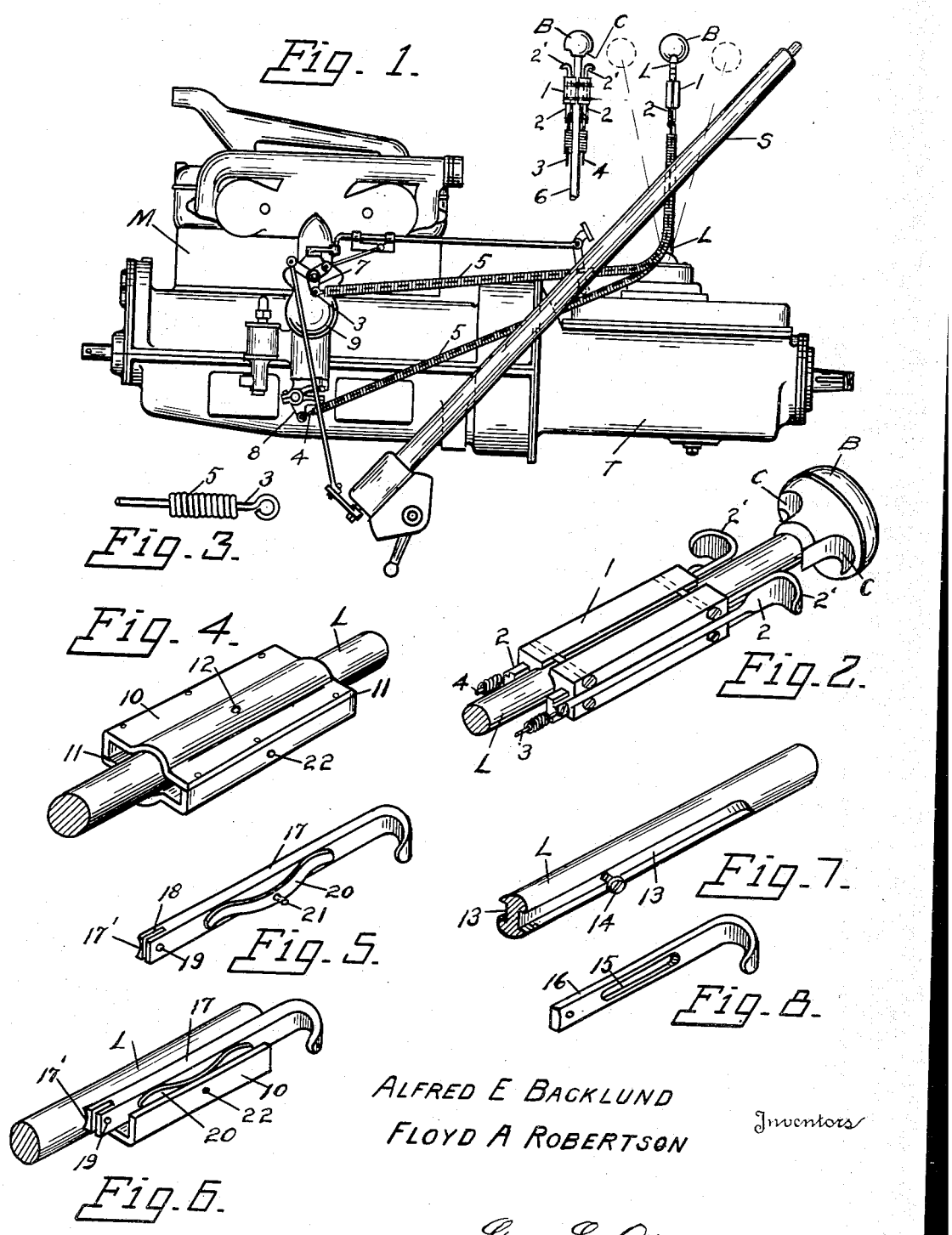
ALFRED E BACKLUND
FLOYD A ROBERTSON  Inventors
By George E. Adams
Attorney Patented Oct. 9, 1934

1,976,429

UNITED STATES PATENT OFFICE 1,976,429

AUTOMOTIVE THROTTLE AND CHOKE CONTROL

Alfred E. Backlund and Floyd A. Robertson, Spokane, Wash.

Application March 27, 1933, Serial No. 662,968

2 Claims. (Cl. 74—472)

This invention relates to improvements in automotive throttle and choke controls and includes that type thereof, capable of controlling the throttle, or choke, on automotive equipment, with the same hand and at the same time that a shift of gears is made in the transmission chamber, or, independent of the said gear shift, if desired.

The several objects of the invention are to provide convenient means of opening or closing the throttle, or opening or closing the choke, or both simultaneously if desired, with the same hand and while shifting gears, as, for example, when an automobile is ascending a steep hill, but fails to reach the top without a shift of gears to a more powerful ratio. During the operation of shifting the gears, one hand, usually the right, is engaged in operating the gear shift lever, the left hand grasping the steering wheel, the left foot holding the clutch in release and the right foot holding the brake. Instantly, to prevent a possibly dangerous mishap, several operations are essentially necessary at the quickest possible moment; this is a perilous moment and if the driver is not quick enough to act, frequently results in disaster, as the driver has no available means on the present type of car to operate the choke or throttle at the desired instant which is immediately upon the meshing of the gears at the time of the shift of same: Previous to the shift, the throttle must be closed, or nearly so, and opened instantly upon the re-meshing of the gears: The left hand or foot is not in position to open the throttle or choke even if it were not otherwise engaged, therefore this must be accomplished by either the right hand or foot, but the brake must not be released until after the car is ready to go forward, therefore the right hand must assume the duty and to facilitate the operation is the principal object of this invention.

This invention does not require any re-arrangement of the regular hand, or foot throttle, or the choke control, but simply places an additional control for either within easy reach of the fingers of the driver on the same hand that he uses to shift the gears, and allows the operator to accomplish this necessary operation without removing his left hand, or his feet, from their positions on the clutch release or brake pedals.

These objects are attained by the utilization of our invention together with the sundry articles necessary to comprise a complete control unit, and, in some instances, a modified form of the control used may better suit the particular type of car: Typical examples of several structures embodying the principles of our invention are shown in the accompanying drawing, which is a part of this specification.

The operation of the invention is thus briefly explained and described:—Slidably attached to the gear shift lever of an automobile or automotive truck, and at a suitable distance from the top, is located a pair of push or pull rods, preferably mounted one on each side so as to easily be pushed or pulled by the fingers of the right hand while the palm rests on the top of the lever: The lower ends of the rods are connected respectively to flexible wires leading to the throttle and choke arms at the carburetor; the wires are usually encased in a flexible sheath composed of wire coiled or wound the same as a closely wound tension spring and which is a commercial article frequently used on automotive equipment for effecting a light push or pull action. When it is desired to open the throttle, or the choke, from the gear shift lever, the fingers of the hand depend downward from the top of the lever, engage the desired push rod and pull it up. Usually, the foot throttle is closed by a spring which will serve the purpose of closing it in this case also, if not, another spring may be added that will do so, without inconvenience. The choke is not ordinarily closed or opened except upon the action of the driver, therefore it is advisable to arrange the choke control so as it will remain in the position in which it is placed until removed by an additional operation and which is accomplished by means of a frictional spring, or a screw head tightened down to cause friction, all of which will hereinafter be more fully described in connection with the drawing, in which we have illustrated one complete example and two modified forms of the best mode we have thus far devised for the practical application of the principles of our invention, in which, Fig. 1 is a side elevation of an automobile gasoline motor and transmission case as viewed from the carburetor side, together with the gear shift lever and a portion of the steering column; the gear shift lever as here shown is equipped with our invention.

Fig. 2 is an enlarged view, in perspective, of the throttle and choke operating mechanism as applied to the gear shift lever in Fig. 1.

Fig. 3 shows a portion of the commonly used sheathed wire which connects the throttle and choke arms at the carburetor with the lower ends of the pull or push rods on the gear shift lever.

Fig. 4 is a modified form of guide, through which the pull or push rods slidably move, and a portion of the gear shift lever.

Fig. 5 is a modification, in perspective, of a pull or push rod, together with a flat spring on one side, preferably to be used on the choke pull or push rod, and adaptable for use with the guide of Fig. 4.

Fig. 6 is a perspective view of a portion of the gear shift lever, and a portion of the guide in Fig. 4, together with the pull or push rod and spring of Fig. 5 assembled.

Fig. 7 is another modification of a guide, consisting of detents or key ways fashioned longitudinally on opposite sides in the gear shift lever into which the pull and push rods are slidably mounted.

Fig. 8 is a perspective view of a pull or push rod suitable for use in the key ways of Fig. 7, the screw of the latter, when inserted in the slot of the rod of Fig. 8 may be tightened sufficiently to produce friction for the choke push or pull rod, or simply as a retainer for the throttle rod.

Referring to the drawing, we have shown in Fig. 1, a motor M and transmission gear case T together with a gear shift lever L, in neutral position, with its forward and rear positions indicated in dotted lines, and a portion of the steering column S. Rigidly attached to, or integral with the gear shift lever L is shown a guide block 1, located conveniently near the upper end of lever L. Guide block 1 slidably supports two pull or push rods 2, having their upper ends terminating in hooks as at 2', in such manner as to be easily pulled or pushed by the operator's fingers while his hand grasps the ball or knob B on top of lever L, the lower side of ball or knob B being shown as cut away as at C to allow the upper ends of the pull or push rods to be pulled up into the recesses C if desired: The lower ends of the rods 2 are fashioned so as to be attached to flexible wires 3 and 4 encased in flexible metallic sheaths 5 and which is commonly used for such purposes as connecting levers or arms of light construction to convenient positions on the instrument board of a car. The wires 3 and 4 lead to and connect with the throttle and choke arms respectively as 7 and 8 at the carburetor 9; the combination of which allows the throttle or the choke to be operated by the fingers of the hand of the driver while, and with the same hand as used to shift the gears.

The construction of guide block 1 may be simplified if desired, as shown at 10 in Fig. 4, it being made of two similar pieces, one being reversed and placed with the other, forming a jacket, and the joints riveted or welded together as at 11, and pinned to the shift lever as at 12. If the shift lever L is large enough in cross section, it may be key-seated as at 13, Fig. 7, and a retaining screw 14 inserted through the slot 15 of the push rod 16, Fig. 8, which slidably fits the key-seat 13. Another method of frictionally holding the push rod 2 against voluntary movement is shown in Figs. 5 and 6, adapted to be used in the guide 10 of Fig. 4. Push rod 17 is concaved longitudinally on the inside as at 17' to fit the shank of the gear shift lever L, and is slotted as at 18 to admit the wire loop of 3, the same being held with a pin or screw through the hole 19. Push rod 17 is shown frictionally engaged between lever L and the inside of guide box 10, Fig. 6, by a flat spring 20 which is held in position by the pin 21 being inserted in the hole 22; sufficient of the guide box 10 being shown in Fig. 6 to disclose the assembly of the lever L, the push rod 17 and the spring 20.

Having thus fully described our invention, what we claim as new and desire to secure by Letters Patent is:—

1. In the combination of a throttle and choke control mechanism with a gear shift lever having keyways in said lever and slidably retained actuating members in the keyways, threaded openings in the lever at the bottom of the keyways for the reception of screws, slots in the actuating members through which the said screws are inserted into the lever, and screws for the retention of the actuating members in the keyways.

2. In the combination of a throttle and choke control mechanism with a gear shift lever, slidably mounted actuating members having concaved faces adjacent to the lever, said faces having the same radius of curvature as the shank of said lever, slots in the actuating members, threaded means in the lever for the reception of screws to hold said actuating members in slidable contact with said lever and screws for insertion through said slots and into said lever for slidably retaining said actuating members on said lever, hooked ends on the upper portion and means for attaching transmission wires at the lower ends of said actuating members.

ALFRED E. BACKLUND.
FLOYD A. ROBERTSON.